United States Patent
Serino et al.

(10) Patent No.: US 9,677,270 B2
(45) Date of Patent: Jun. 13, 2017

(54) EXTERIOR POLYMER-BASED BRICK BUILDING MATERIAL

(71) Applicant: Dryvit Systems, Inc., West Warwick, RI (US)

(72) Inventors: Roland Serino, East Greenwich, RI (US); William Preston, Johnston, RI (US); Robert Lombardi, West Greenwich, RI (US)

(73) Assignee: Dryvit Systems, Inc., West Warwick, RI (US)

( * ) Notice: Subject to any disclaimer, the term of this patent is extended or adjusted under 35 U.S.C. 154(b) by 0 days.

(21) Appl. No.: 15/351,566

(22) Filed: Nov. 15, 2016

(65) Prior Publication Data

US 2017/0067255 A1 Mar. 9, 2017

Related U.S. Application Data

(63) Continuation of application No. PCT/US2016/049818, filed on Sep. 1, 2016.
(Continued)

(51) Int. Cl.
*E04C 1/40* (2006.01)
*E04F 13/18* (2006.01)
(Continued)

(52) U.S. Cl.
CPC .............. *E04C 1/40* (2013.01); *B32B 5/028* (2013.01); *B32B 7/12* (2013.01); *B32B 27/06* (2013.01);
(Continued)

(58) Field of Classification Search
CPC ...... E04C 1/40; E04B 1/7625; E04F 13/0873; E04F 13/18; E04F 13/076; B32B 7/12;
(Continued)

(56) References Cited

U.S. PATENT DOCUMENTS 4,069,075 A * 1/1978 Billing .................... E04B 1/943
156/71
4,077,177 A * 3/1978 Boothroyd ................ E04B 1/32
264/32
(Continued)

FOREIGN PATENT DOCUMENTS

| FR | 2633563 A1 | 1/1990 |
| GB | 1127311 A | 9/1968 |
| GB | 2457293 A | 8/2009 |

OTHER PUBLICATIONS

International Search Report and Written Opinion for International Application No. PCT/US2016/049818 dated Jan. 12, 2017.
(Continued)

*Primary Examiner* — Jeanette E Chapman
(74) *Attorney, Agent, or Firm* — Calfee, Halter & Griswold LLP

(57) ABSTRACT

A simulated brick includes a polymeric core member, a mesh layer adhered to the core member, a basecoat layer covering an entirety of the mesh layer, and a finish layer covering an entirety of the basecoat layer. The core member, the mesh layer, the basecoat layer, and the finish layer together define a brick profile portion having first and second lateral sides extending to a planar outer surface to define a first thickness, and an offset portion extending from the first lateral side of the brick profile portion to a lateral end surface and having an outer surface defining a second thickness smaller than the first thickness, the brick profile portion and the offset portion together defining a planar rectangular base surface extending from the second lateral side of the brick profile portion to the lateral end surface of the offset portion.

30 Claims, 3 Drawing Sheets

Related U.S. Application Data

(60) Provisional application No. 62/212,884, filed on Sep. 1, 2015.

(51) Int. Cl.
| | | |
|---|---|---|
| *E04F 13/08* | (2006.01) | |
| *E04F 13/076* | (2006.01) | |
| *B32B 7/12* | (2006.01) | |
| *B32B 37/12* | (2006.01) | |
| *B32B 5/02* | (2006.01) | |
| *B32B 27/06* | (2006.01) | |
| *B32B 37/14* | (2006.01) | |
| *E04B 1/76* | (2006.01) | |

(52) U.S. Cl.
CPC .............. *B32B 37/12* (2013.01); *B32B 37/14* (2013.01); *E04F 13/076* (2013.01); *E04F 13/0873* (2013.01); *E04F 13/0875* (2013.01); *E04F 13/18* (2013.01); *E04F 13/185* (2013.01); *B32B 2307/3065* (2013.01); *B32B 2419/02* (2013.01); *E04B 1/7625* (2013.01); *E04F 2201/026* (2013.01)

(58) Field of Classification Search
CPC ......... B32B 37/12; B32B 37/14; B32B 27/06; B32B 5/028; B32B 2307/3065
See application file for complete search history.

(56) References Cited

U.S. PATENT DOCUMENTS

| | | | | |
|---|---|---|---|---|
| 4,229,497 | A * | 10/1980 | Piazza | B28B 19/003 264/256 |
| 5,367,847 | A * | 11/1994 | Hepler | E04C 2/296 428/319.9 |
| 5,930,964 | A * | 8/1999 | Boehning | E04C 1/41 52/309.1 |
| 2005/0247022 | A1* | 11/2005 | Poupart | E04F 19/022 52/783.1 |
| 2005/0257475 | A1 | 11/2005 | Gong et al. | |
| 2006/0185299 | A1* | 8/2006 | Poupart | E04C 2/296 52/545 |
| 2008/0216430 | A1 | 9/2008 | Gleeson et al. | |
| 2009/0235600 | A1 | 9/2009 | Logan | |
| 2009/0249722 | A1 | 10/2009 | Russell | |
| 2011/0185662 | A1 | 8/2011 | Mollinger et al. | |
| 2013/0111843 | A1 | 5/2013 | Litral | |
| 2014/0087158 | A1* | 3/2014 | Ciuperca | B32B 7/02 428/215 |
| 2015/0218829 | A1 | 8/2015 | Curtis | |

OTHER PUBLICATIONS

Website printout, Tianjin Jhongjie, "neu polyurethane foam brick wall panel", at least as early as Aug. 31, 2015.
StackEZE Brick Products, as least as early as Aug. 31, 2015.

* cited by examiner

EXTERIOR POLYMER-BASED BRICK BUILDING MATERIAL

CROSS-REFERENCE TO RELATED APPLICATION

This application is a continuation of International Application No. PCT/US2016/049818, filed Sep. 1, 2016, titled EXTERIOR POLYMER-BASED BRICK BUILDING MATERIAL, which claims priority from U.S. Provisional Patent Application Ser. No. 62/212,884, filed on Sep. 1, 2015, for EXTERIOR POLYMER-BASED BRICK BUILDING MATERIAL, the entire disclosure of which is fully incorporated herein by reference.

BACKGROUND

The use of common clay brick as a finish for all types of buildings is very popular and provides unique aesthetics, but such brick finishes are relatively expensive and commonly offer poor insulation. Thin brick cladding, installed over sheathing, concrete, insulation boards, and masonry substrates has been available as an alternative, but such wall cladding systems are often deficient in fire resistant properties and ease of installation.

SUMMARY

The present disclosure is directed to polymer-based building products, particularly polymer-based exterior wall cladding and exterior wall cladding systems, and related methods for preparing the exterior wall cladding and exterior wall cladding systems.

Accordingly, in an exemplary embodiment, a simulated brick includes a polymeric core member, a mesh layer adhered to the core member, a basecoat layer covering an entirety of the mesh layer, and a finish layer covering an entirety of the basecoat layer. The core member, the mesh layer, the basecoat layer, and the finish layer together define a brick profile portion having first and second lateral sides extending to a planar outer surface to define a first thickness, and an offset portion extending from the first lateral side of the brick profile portion to a lateral end surface and having an outer surface defining a second thickness smaller than the first thickness, the brick profile portion and the offset portion together defining a planar rectangular base surface extending from the second lateral side of the brick profile portion to the lateral end surface of the offset portion.

In another exemplary embodiment, a method of manufacturing a simulated brick is contemplated. In an exemplary method, a polymeric core member is formed, the core member including a brick profile portion having first and second lateral sides extending to a planar outer surface to define a first thickness, and an offset portion extending from the first lateral side of the brick profile portion to a lateral end surface and having an outer surface defining a second thickness smaller than the first thickness, the brick profile portion and the offset portion together defining a planar rectangular base surface extending from the second lateral side of the brick profile portion to the lateral end surface of the offset portion. A mesh layer is adhered to the first and second lateral sides and the outer surface of the brick profile portion and to the lateral end surface and the outer surface of the offset portion. A basecoat layer is deposited onto an entirety of the mesh layer. A finish layer is deposited onto an entirety of the basecoat layer.

In another exemplary embodiment, a method of applying simulated bricks to a wall surface is contemplated. In an exemplary method, at least first and second simulated bricks are provided, with each including a brick profile portion having first and second lateral sides extending to a planar outer surface to define a first thickness, and an offset portion extending from the first lateral side of the brick profile portion to a lateral end surface and having an outer surface defining a second thickness smaller than the first thickness, the brick profile portion and the offset portion together defining a planar rectangular base surface extending from the second lateral side of the brick profile portion to the lateral end surface of the offset portion. An adhesive layer is applied to the wall surface. The base surface of the first simulated brick is adhered to the adhesive layer, and the base surface of the second simulated brick is adhered to the adhesive layer such that at least a portion of the lateral end surface of the offset portion of the second simulated brick abuts the second lateral side of the brick profile portion of the first simulated brick. A grout material is applied to the outer surface of the offset portion of the second simulated brick.

In another exemplary embodiment, a wall system includes a wall substrate having a substantially planar exterior surface, and at least first and second simulated bricks. The first and second simulated bricks each include a brick profile portion having first and second lateral sides extending to a planar outer surface to define a first thickness, and an offset portion extending from the first lateral side of the brick profile portion to a lateral end surface and having an outer surface defining a second thickness smaller than the first thickness, the brick profile portion and the offset portion together defining a planar rectangular base surface extending from the second lateral side of the brick profile portion to the lateral end surface of the offset portion. The planar rectangular base surfaces of the first and second simulated bricks are adhered to the exterior surface of the wall substrate such that at least a portion of the lateral end surface of the offset portion of the second simulated brick abuts the second lateral side of the brick profile portion of the first simulated brick. A grout material is adhered to the outer surface of the offset portion of the second simulated brick.

DETAILED DESCRIPTION

The present disclosure is directed to insulative wall cladding building products, particularly polymer-based simulated bricks, and related methods for preparing and installing the building products. In certain exemplary embodiments, a polymer-based building product includes a polymer core member at least partially covered with a reinforcing mesh material, such as a fiberglass mesh material. The reinforcing mesh material is at least partially coated with or at least partially embedded in a basecoat layer, such as a polymer-modified cementitious basecoat, and the basecoat layer is at least partially covered by an outermost finish layer, to provide a desired color and texture for the wall cladding. In one such exemplary embodiment, the textured finish layer gives the exterior wall cladding the appearance of a conventional clay brick.

Figure 1:
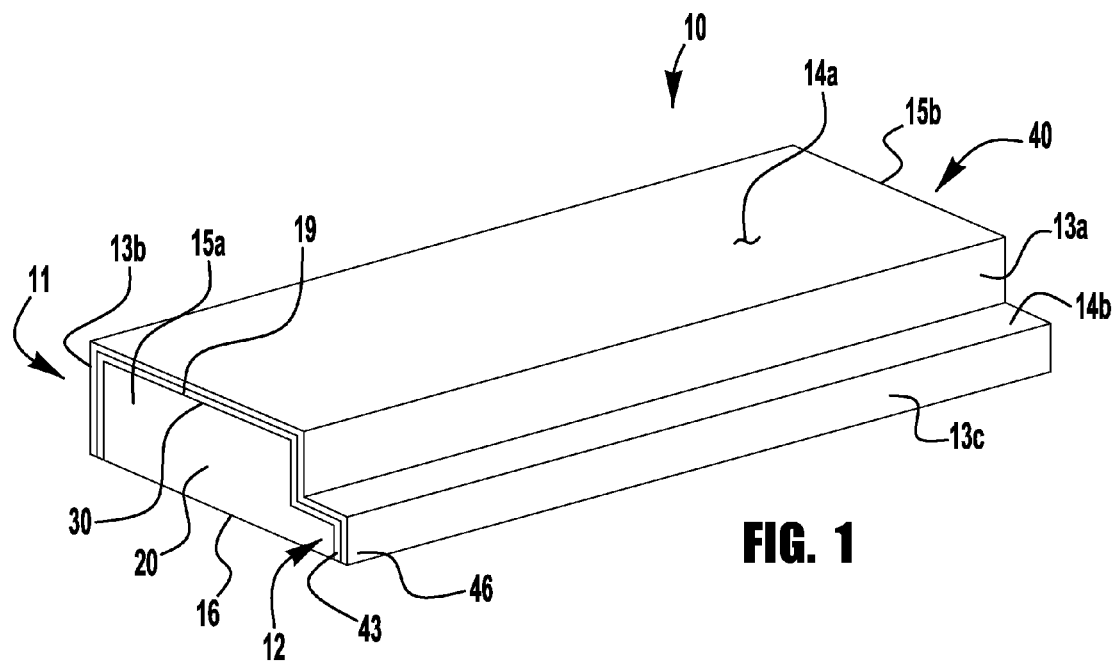
FIG. 1 shows an upper perspective view of an exemplary simulated brick wall cladding component according to the present disclosure.
Figure 2:
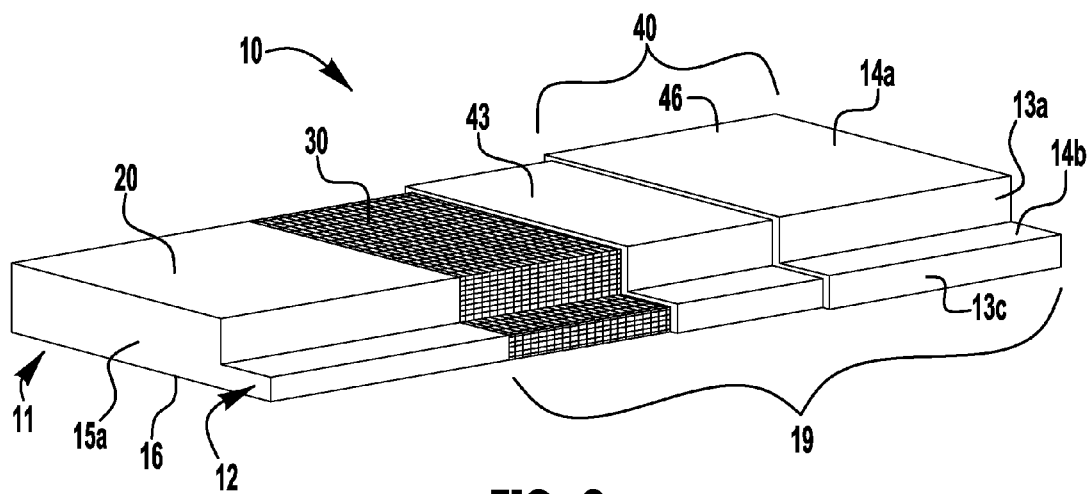
FIG. 2 shows an upper perspective cut-away cross-sectional view of the simulated brick wall cladding component of FIG. 1.

FIGS. 1 and 2 illustrate an exemplary simulated brick 10 including a polymeric core member 20, a mesh layer 30 adhered to the core member 20, and a coating 40 covering the mesh layer 30. In some embodiments, the coating may include a single layer providing protection for the core member, a barrier to fire propagation, exterior surface durability, and desired exterior aesthetic characteristics (e.g., color, texture). In other embodiments, as shown, the coating 40 may include an inner, basecoat layer 43 directly deposited (e.g., by extrusion coating) onto the mesh layer 30 to cover the mesh layer and to provide strength and fire barrier properties, and a finish layer 46 deposited (e.g., by extrusion coating) onto the basecoat layer 43 to provide desired surface durability and exterior aesthetic properties. In still other embodiments, additional coating layers may be provided.

The mesh layer 30, basecoat layer 43, and the finish layer 46 may together form a relatively thin (e.g., about ⅛ inch thick) laminate 19 defining the lateral (or side) surfaces 13a, 13b, 13c and outer (or top) surfaces 14a, 14b of the simulated brick 10. As shown, the end surfaces 15a, 15b of the core member 20 may remain exposed or uncovered by the laminate 19, allowing for production of the simulated bricks by forming an elongated laminated core that is cut into multiple brick-sized wall cladding components. A base (or bottom) surface 16 of the core member 20 may also be exposed or uncovered by the laminate 19, for example, to facilitate adhesion of the simulated brick 10 to a wall surface.

The core member material may be selected to provide desired insulation properties. Exemplary materials include polystyrene foams such as expanded polystyrene ("EPS") or extruded polystyrene ("XPS") or other similar insulation materials, including, for example, polyisocyanurate, polyurethane, and foam glass. In certain embodiments, the core is a polymer material having a density of about 0.5 to about 5 pcf, or about 1 to about 2 pcf, or about 1.5 pcf. In an exemplary embodiment, the core is an XPS having a density of 1.5 pcf. In accordance with certain exemplary embodiments, the core is an XPS meeting ASTM C578. The insulative polymer core member may provide an effective R-value between about 2 and about 8 h·° F.·ft²·in/BTU. In an exemplary embodiment, an XPS core member has an R-value of about 5 h·° F.·ft²·in/BTU.

The mesh layer 30 may include a variety of reinforcing, strengthening, and/or fire resistant mesh materials, such as, for example, a fiberglass or polymer strand material. Non-limiting examples of suitable polymer mesh materials include polyester, polypropylene, aramid, and carbon. The reinforcing mesh may be constructed using an open weave. In certain embodiments, the reinforcing mesh material includes or is coated with an alkali resistant material. In certain embodiments, the mesh layer 30 is provided with an adhesive on one side so it can be applied directly to the surface of the core member 20 to maintain its position until the basecoat layer 43 is deposited over the mesh layer. The alkali resistance improves compatibility of the reinforcing mesh material with cement-based materials, such as cement-based mortars, grouts, basecoat layer, and the like used in accordance with the present disclosure. In one such exemplary embodiment, the reinforcing mesh material comprises an about 3.6 lbs/yd² weight, open weave of fiberglass strands including alkali resistant glass and/or glass fibers coated with an alkali resistant material. In certain embodiments, the reinforcing mesh material comprises a fire resistant or non-combustible material, such as certain types of fiberglass and/or certain fiberglass or polymer strands coated with a fire resistant size composition. The fire resistant mesh material may be selected to produce, in combination with the other simulated brick materials, a wall cladding product suitable to meet one or more applicable non-combustible, fire resistant, and/or fire proof standards, including, for example, NFPA 285, NFPA 268, ASTM E84, and ASTM E119. In one such example, the mesh material has a melting point of approximately 2000° F.

The basecoat layer 43 may include any of a variety of suitable materials compatible with, and adherent to, the core 20, mesh 30, and textured finish layer 46, such as, for example, a polymer modified cementitious mortar material. In an exemplary embodiment, the basecoat layer comprises a Type N or S mortar modified with a suitable amount of acrylic polymer to provide improved adhesion, flexibility and workability. One such polymer modified mortar material includes Portland cement, silica sands, styrene acrylic based polymers and other non-combustible fillers. As shown, the basecoat layer 43 may cover an entirety of the mesh layer 30.

The textured finish layer 46 may include any of a variety of suitable materials compatible with, and adherent to, the basecoat layer 43 and mortar/grout material used with the simulated bricks (described below), and that provides the desired durability, texture, and appearance, such as that of a clay brick. Exemplary materials include acrylic, styrene acrylic, veova, or vinyl acrylic acetate. The textured surface layer may be suited to weather a variety of external environmental conditions, such as damaging effects caused by the sun, rain, cold, humidity, etc. As shown, the finish layer 46 may cover an entirety of the basecoat layer 43.

In accordance with certain embodiments, the exterior wall cladding (e.g., simulated bricks) may be applied to any common exterior wall surface, including, plywood, oriented strand board, glass mat gypsum sheathing, cement board sheathing, ICF's, exterior insulation and finish system ("EIFS") basecoat, concrete, and masonry. Typically, square-edged insulation bricks (which are not in accordance with the present disclosure) are applied to an uncoated expanded polystyrene core member that has built-in projecting strips or offsets, thereby allowing the squared-edged brick to maintain its position on the wall without sliding. Square-edged insulation bricks applied to other surfaces require the use of tile spacers or metal pans and clips to allow the bricks to stay in position without sliding and also to keep a consistent grout joint.

According to one aspect of the present application, a simulated brick wall cladding component may be provided with a brick profile portion and at least one offset portion extend from at least one lateral side of the brick profile portion to abut at least a portion of a brick profile portion of an adjacent simulated brick when the simulated bricks are secured to a wall surface. The offset portion may facilitate installation of a multiple row array of the simulated bricks, by providing for consistent, uniform spacing between the brick profile portions of adjacent rows of simulated bricks, preventing misalignment due to slippage without the use of spacer tiles, clips, or metal pans, as commonly used in the installation of conventional "thin brick" wall cladding.

Additionally, these offset portions may provide additional insulation for the mortar joint spaces between the simulated bricks.

To form a simulated brick having a lateral offset portion, as shown in FIGS. 1 and 2, the core member 20 may be provided with a brick profile portion 11, generally in the shape of a thin brick (e.g., about 7⅝ inches long, about 2¼ inches wide, and about 1 inch thick, or about 7⅝ inches long, about 2⅝ inches wide, and about 1⅛ inches thick, or about 11⅝ inches long, about 4 inches wide, and about 1⅛ inches thick). The exemplary brick profile portion includes first and second lateral sides 13a, 13b extending to a planar outer surface to define a uniform thickness, and a thinner lip or offset portion 12 extending laterally from the first lateral side 13a of the brick profile portion 11 to a lateral end surface 13c of the offset portion. The brick profile portion 11 and the offset portion 12 together define a planar rectangular base surface 16 extending from the second lateral side 13b of the brick profile portion to the lateral end surface 13c of the offset portion 12. As shown, the first and second lateral sides 13a, 13b, the lateral end surface 13c, and the outer surfaces 14a, 14b may be defined by the finish layer 46, and the base surface 16 may be defined by the core member 20.

In the exemplary embodiment, the offset portion 12 extends a distance corresponding to a desired width of a mortar joint to be applied between adjacent rows of simulated bricks 10 (e.g., about ⅜ inches), such that abutment of the thinner offset portion 12 with the brick profile portion of an adjacent brick defines a gap sized to be filled with a mortar joint of the desired width. In other embodiments (not shown), a simulated brick may be provided with smaller offset portions (e.g., about 3/16 inches) extending from both lateral sides of the brick profile portion, such that abutment of the offset portions of adjacent rows of simulated bricks define a gap sized to be filled with a mortar joint of the desired width. In still other embodiments (not shown), a simulated brick may be provided with an offset portion extending from either or both of the longitudinal ends of the simulated brick, such that abutment of adjacent simulated bricks in a row defines a gap sized between adjacent longitudinal ends of the brick profile portions, to be filled with a mortar joint of the desired width.

The offset portion may be provided in a wide variety of suitable thicknesses, thick enough to function as a rigid spacer, and thin enough to provide sufficient space for grout material to provide the appearance of conventional brick masonry. The ratio of the thickness of the offset portion to the thickness of the brick profile portion may, for example, be between 5% and 70%, or between 35% and 60%. In one example, the offset portion thickness is about ⅝ inches.

The offset portion 12 of the simulated brick 10 may also provide additional insulation for the wall to which the simulated bricks are secured, as the core member material may have a significantly greater R-value than the mortar/grout component material (e.g., about 5.0 h·° F.·ft²·in/BTU for the extruded polystyrene material of the core member compared to about 0.21 h·° F.·ft²·in/BTU for the grout material). In one embodiment, the offset portion has an R-value of at least 1.0 h·° F.·ft²/BTU. In an exemplary embodiment, the offset portion 12 is about ⅜ inches thick, with the offset portion having a section R-value of about 2.1 h·° F.·ft²/BTU, compared to a section R-value of about 0.24 h·° F.·ft²/BTU for a comparable volume of grout material.

Figure 3:
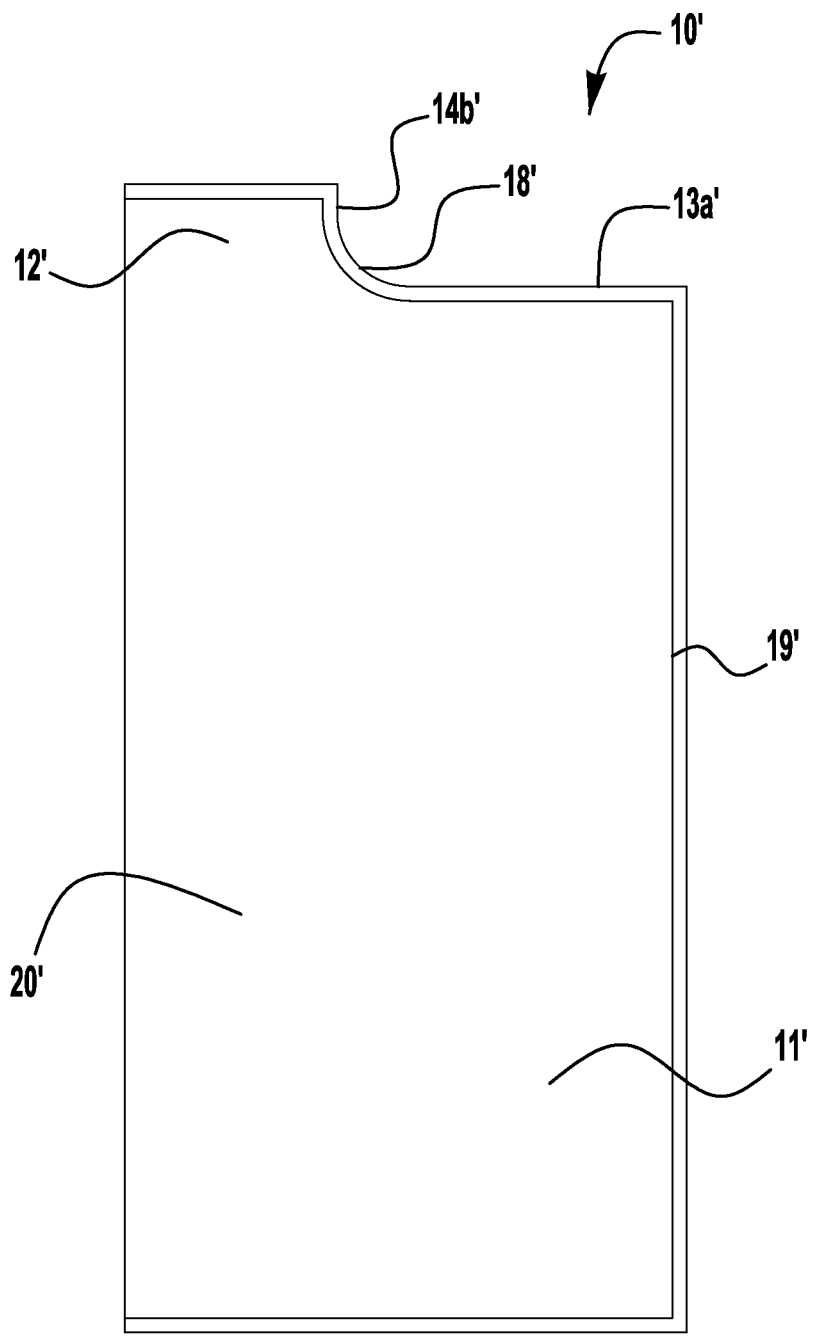
FIG. 3 shows an end view of an exemplary embodiment of a simulated brick wall cladding component.

In forming an exemplary simulated brick, in accordance with an exemplary aspect of the present application, an elongated block or sheet of the core member material (e.g., extruded polystyrene, or other insulation board) may be cut (e.g., hot wire cut) to form an elongated (e.g. about 2 to about 20 feet long, preferably about 4 to about 8 feet long) core defining the brick profile portion 11 and the offset portion 12, as shown. For ease of cutting, the junction between the outer surface 14b' of the offset portion 12' and the first lateral surface 13a' of the brick profile portion 11' may include a radius 18' (e.g., a radius of about ⅛ inch), as shown in the exemplary simulated brick 10' of FIG. 3. In other embodiments, the elongated shaped core may be extruded, molded, or otherwise formed without a cutting operation.

The mesh material is then adhered onto the lateral surfaces 13a, 13b, 13c and the outer surfaces 14a, 14b of the elongated core, for example, by applying (e.g., wrapping, pressing) a self-adhesive side of a mesh material sheet to the lateral and outer surfaces of the elongated core 20, for example, to hold the mesh material in place prior to application of the coating 40. The mesh material may be pre-cut to size for coverage of the elongated core, or trimmed after adhesion to remove any overhanging material.

A polymer modified cementitious basecoat material is prepared (e.g., by mixing) and is supplied, for example, in a hopper. The mesh-covered core is pushed (manually or using an automated system) through an extrusion coating machine to deposit or extrude (e.g., from a hopper above the extruding machine) the polymer modified cementitious basecoat material over the mesh layer 30 on the lateral surfaces 13a, 13b, 13c and the outer surfaces 14a, 14b of the core. The mesh material may be an open weave material, such that the basecoat material penetrates the mesh layer to adhere to the core material, which may further reinforce attachment of the mesh material to the core. In some embodiments, one or more additional layers of basecoat material may be applied.

A finish material (e.g., an acrylic-based architectural finish) is mixed or otherwise prepared, and is supplied, for example, in a hopper. Once the basecoat layer 43 has cured and/or dried and (optionally) has been inspected for imperfections, the coated core is pushed (manually or using an automated system) through an extrusion coating machine to deposit or extrude (e.g., from a hopper above the extruding machine) the finish material over the basecoat layer 43 on the lateral surfaces 13a, 13b, 13c and the outer surfaces 14a, 14b to form the finish layer 46. Prior to fully curing and/or drying, the finish layer may be treated (e.g., rolled, pressed, broadcast of additional materials, etc.) to provide a desired exterior texture or appearance.

Once the finish layer 46 has dried, the coated elongated core may be cut into brick-sized lengths (e.g., between about 3 inches and about 12 inches, or about 7⅝ inches) to form multiple, substantially identical simulated bricks 10. The resulting simulated bricks may then be packaged, stored, and/or shipped for application to an exterior wall.

Figure 4:
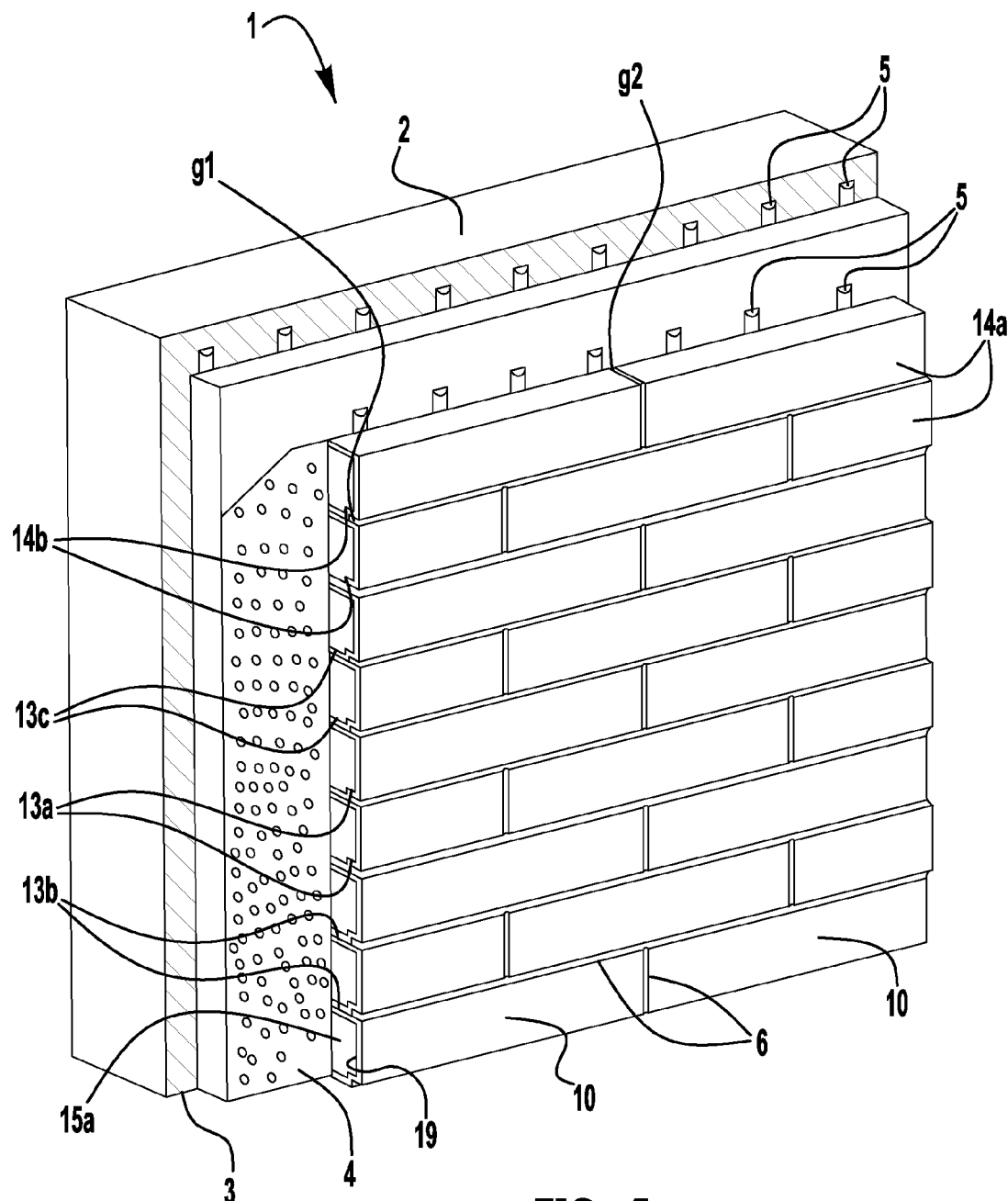
FIG. 4 shows a perspective view of cut-away exterior wall system including an array of simulated brick wall cladding components secured to an exterior wall substrate.

In accordance with various exemplary embodiments of the present application, a method of applying an array of simulated brick cladding components to an exterior wall is contemplated for forming an exterior wall system. In an exemplary method, base surface portions of simulated bricks (e.g., the simulated bricks described above and shown in FIGS. 1-3, and/or simulated bricks constructed using the methods described above) are secured to an exterior wall substrate using a suitable adhesive layer, such as polyurethane foam, polyurethane construction adhesive, acrylic based adhesive, or a polymer modified cementitious mortar as described herein. Suitable substrates include, for example, concrete, masonry, brick, plywood, oriented strand board, cement board, glass mat face gypsum sheathing, insulated concrete forms (ICFs), and EIFS basecoat. In an exemplary wall system 1, as shown in FIG. 4, a wall 2 (e.g., concrete, masonry, ICF, framed wall with sheathing) is coated with an EIFS cladding 3, which includes a fiberglass reinforced EIFS basecoat 4. While the simulated bricks may be secured directly to, and in uniform planar contact with, the EIFS basecoat 4, in the illustrated embodiment, the adhesive layer includes a series of spaced apart adhesive strips 5 or other such spacers are provided between the EIFS basecoat 4 and the base surface portions 16 of the simulated bricks 10, for example, to facilitate drainage of incidental water that may enter the cavity behind the bricks. Similar strips 5 may likewise be provided between the EIFS cladding 3 and basecoat 4.

As shown in FIG. 4, the simulated bricks 10 are secured to the EIFS basecoat wall surface in adjacent rows, with lateral end surfaces 13c of the offset portions 12 of the simulated bricks of a first row abutting the second lateral sides 13b of the simulated bricks of a second row, to define lateral gaps g1 between these lateral surfaces 13b, 13c. The simulated bricks 10 in each row may likewise be spaced from each other by longitudinal gaps g2, for example by manual user placement of the adjacent simulated bricks to provide such gaps g2, or by use of a longitudinally extending offset portion (not shown), as described above. Once the adhesive sufficiently cures, the gaps g1, g2 may be substantially filled by a grout or mortar material 6 applied between the bricks 10 and over the outer surfaces of the offset portions. In accordance with embodiments disclosed herein, the mortar or grout material used between the exterior wall cladding bricks in the systems disclosed herein may comprise the same or similar polymer modified cementitious mortar material that is used as the basecoat. As an alternative, an elastomeric sealant material may be used between the bricks. Preferably, the mortar/sealant imparts water resistance to the joints between the exterior wall cladding bricks.

The present disclosure is also directed to exterior wall cladding systems comprising the exterior wall claddings disclosed herein as applied to an exterior wall or exterior wall system. An exemplary wall system of the present disclosure may include an offset-aligned, multiple row array of simulated brick wall cladding components secured to an exterior wall surface by a mortar/grout material, with gaps between the adjacent simulated bricks filled by a mortar/grout material as shown in FIG. 4 and described above.

Unless otherwise indicated herein, all sub-embodiments and optional embodiments are respective sub-embodiments and optional embodiments to all embodiments described herein. While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative compositions or formulations, and illustrative examples shown and described. Accordingly, departures may be made from such details without departing from the spirit or scope of the applicant's general disclosure herein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein may be used in practice or testing of the nutritional composition. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use.

All percentages, parts, and ratios as used herein are by weight of the total product, unless specified otherwise. All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

All combinations of method or process steps as used herein can be performed in any order, unless otherwise specified or clearly implied to the contrary by the context in which the referenced combination is made.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, hardware, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

While the present invention has been illustrated by the description of embodiments thereof, and while the embodiments have been described in considerable detail, it is not the intention of the applicant to restrict or in any way limit the scope of the invention to such detail. Additional advantages and modifications will readily appear to those skilled in the art. For example, the specific locations of the component connections and interplacements can be modified. Therefore, the invention, in its broader aspects, is not limited to the specific details, the representative apparatus, and illustrative examples shown and described. Accordingly, departures can be made from such details without departing from the spirit or scope of the applicant's general inventive concept.

The invention claimed is:

1. A simulated brick comprising:
    a polymeric core member; and
    a laminate comprising a mesh layer adhered to the core member; a basecoat layer covering an entirety of the mesh layer; and a finish layer covering an entirety of the basecoat layer;
    wherein the core member and the laminate together define a brick profile portion having first and second lateral sides extending to a planar outer surface to define a first thickness, and an offset portion extending from the first lateral side of the brick profile portion to a lateral end surface and having an outer surface defining a second thickness smaller than the first thickness, the brick profile portion and the offset portion together defining a planar rectangular base surface extending from the second lateral side of the brick profile portion to the lateral end surface of the offset portion;
    wherein the laminate covers the core member to define the first and second lateral sides and the outer surface of the brick profile portion, and the lateral end surface and the outer surface of the offset portion, and the core member is uncovered by the laminate on the base surface such that the core member defines the base surface.

2. The simulated brick of claim 1, wherein the second thickness is between 5% and 70% of the first thickness.

3. The simulated brick of claim 1, wherein the second thickness is between 35% and 60% of the first thickness.

4. The simulated brick of claim 1, wherein the brick profile portion has an R-value of at least 2.0 h·° F.·ft$^2$·in/BTU.

5. The simulated brick of claim 1, wherein the offset portion has an R-value of at least 1.0 h·° F.·ft$^2$·in/BTU.

6. The simulated brick of claim 1, wherein the mesh layer, the basecoat layer, and the finish layer together form a laminate having a thickness of approximately ⅛ inch.

7. The simulated brick of claim 1, wherein the core member comprises at least one of polystyrene, extruded polystyrene, expanded polystyrene, polyisocyanurate, polyurethane, and foam glass.

8. The simulated brick of claim 1, wherein the mesh layer comprises at least one of fiberglass, polyester, polypropylene, aramid, and carbon.

9. The simulated brick of claim 1, wherein the mesh layer comprises a fire resistant material.

10. The simulated brick of claim 1, wherein the finish layer comprises at least one of acrylic, vinyl acrylic acetate, veova, and styrene acrylic.

11. The simulated brick of claim 1, wherein the core member has a density between about 0.5 pcf and about 5 pcf.

12. The simulated brick of claim 1, wherein the basecoat layer comprises polymer-modified cement.

13. The simulated brick of claim 1, wherein the brick profile portion and the offset portion extend longitudinally between first and second longitudinal end surfaces, with the core member being uncovered by the laminate on the first and second longitudinal end surfaces such that the core member defines the first and second longitudinal end surfaces.

14. The simulated brick of claim 1, wherein a junction between the outer surface of the offset portion and the first lateral surface of the brick profile portion comprises a radius surface.

15. The simulated brick of claim 1, wherein the second lateral side of the brick profile portion comprises a planar surface extending from the base surface to the outer surface of the brick profile portion.

16. The simulated brick of claim 1, wherein the lateral end surface of the offset portion comprises a planar surface extending from the base surface to the outer surface of the offset portion.

17. The simulated brick of claim 1, wherein:
    the brick profile portion and the offset portion extend longitudinally between first and second longitudinal end surfaces, with the core member being uncovered by the laminate on the first and second longitudinal end surfaces such that the core member defines the first and second longitudinal end surfaces;
    the second lateral side of the brick profile portion comprises a planar surface extending from the base surface to the outer surface of the brick profile portion; and
    the lateral end surface of the offset portion comprises a planar surface extending from the base surface to the outer surface of the offset portion.

18. The simulated brick of claim 1, wherein the second lateral side of the brick profile portion comprises a planar surface extending perpendicularly from the base surface to the outer surface of the brick profile portion.

19. The simulated brick of claim 1, wherein the lateral end surface of the offset portion comprises a planar surface extending perpendicularly from the base surface to the outer surface of the offset portion.

20. The simulated brick of claim 1, wherein:
    the brick profile portion and the offset portion extend longitudinally between first and second longitudinal end surfaces, with the core member being uncovered by the laminate on the first and second longitudinal end surfaces such that the core member defines the first and second longitudinal end surfaces;
    the second lateral side of the brick profile portion comprises a planar surface extending perpendicularly from the base surface to the outer surface of the brick profile portion; and
    the lateral end surface of the offset portion comprises a planar surface extending perpendicularly from the base surface to the outer surface of the offset portion.

21. A simulated brick comprising:
    a polymeric core member;
    a mesh layer adhered to the core member;
    a basecoat layer covering an entirety of the mesh layer; and
    a finish layer covering an entirety of the basecoat layer;

wherein the core member, the mesh layer, the basecoat layer, and the finish layer together define a brick profile portion having first and second lateral sides extending to a planar outer surface to define a first thickness, and an offset portion extending from the first lateral side of the brick profile portion to a lateral end surface and having an outer surface defining a second thickness smaller than the first thickness, the brick profile portion and the offset portion together defining a planar rectangular base surface extending from the second lateral side of the brick profile portion to the lateral end surface of the offset portion;

wherein the finish layer defines the first and second lateral sides and the outer surface of the brick profile portion, and the lateral end surface and the outer surface of the offset portion, and the core member defines the base surface.

22. A method of manufacturing a simulated brick, the method comprising:

forming a polymeric core member including a brick profile portion having first and second lateral sides extending to a planar outer surface to define a first thickness, and an offset portion extending from the first lateral side of the brick profile portion to a lateral end surface and having an outer surface defining a second thickness smaller than the first thickness, the brick profile portion and the offset portion together defining a planar rectangular base surface extending from the second lateral side of the brick profile portion to the lateral end surface of the offset portion;

adhering a mesh layer to the first and second lateral sides and the outer surface of the brick profile portion and to the lateral end surface and the outer surface of the offset portion;

depositing a basecoat layer onto an entirety of the mesh layer; and depositing a finish layer onto an entirety of the basecoat layer;

wherein the mesh layer, the basecoat layer, and the finish layer together form a laminate that covers the core member to define the first and second lateral sides and the outer surface of the brick profile portion, and the lateral end surface and the outer surface of the offset portion, and the core member is uncovered by the laminate on the base surface such that the core member defines the base surface.

23. The method of claim 22, wherein forming the polymeric core member comprises wire cutting an insulation board to form the brick profile portion and the offset portion.

24. The method of claim 22, wherein adhering the mesh layer comprises applying a self-adhesive surface of the mesh layer to the first and second lateral sides and the outer surface of the brick profile portion and to the lateral end surface and the outer surface of the offset portion.

25. The method of claim 22, wherein depositing the basecoat layer onto the entirety of the mesh layer comprises extruding the basecoat layer onto the entirety of the mesh layer.

26. The method of claim 22, wherein depositing the finish layer onto the entirety of the basecoat layer comprises extruding the finish layer onto the entirety of the basecoat layer.

27. A wall system comprising:

a wall substrate including a substantially planar exterior surface; and at least first and second simulated bricks, each comprising a brick profile portion having first and second lateral sides extending to a planar outer surface to define a first thickness, and an offset portion extending from the first lateral side of the brick profile portion to a lateral end surface and having an outer surface defining a second thickness smaller than the first thickness, the brick profile portion and the offset portion together defining a planar rectangular base surface extending from the second lateral side of the brick profile portion to the lateral end surface of the offset portion, each of the first and second simulated bricks comprising a polymeric core member and a laminate comprising a mesh layer adhered to the core member; a basecoat layer covering an entirety of the mesh layer; and a finish layer covering an entirety of the basecoat layer, wherein the laminate covers the core member to define the first and second lateral sides and the outer surface of the brick profile portion, and the lateral end surface and the outer surface of the offset portion, and the core member is uncovered by the laminate on the base surface such that the core member defines the base surface;

wherein the planar rectangular base surfaces of the first and second simulated bricks are adhered to the exterior surface of the wall substrate such that at least a portion of the lateral end surface of the offset portion of the second simulated brick abuts the second lateral side of the brick profile portion of the first simulated brick; and wherein a grout material is adhered to the outer surface of the offset portion of the second simulated brick.

28. The system of claim 26, wherein the first and second simulated bricks are substantially identical.

29. The system of claim 27, wherein the adhesive layer comprises at least one of polyurethane foam, polyurethane construction adhesive, and acrylic based adhesive.

30. The system of claim 27, wherein the grout material comprises at least one of Type N cement mortar, Type S cement mortal, and elastomeric sealant.

* * * * *